May 29, 1956 P. RUTTKAY 2,747,719
ARTICLE HANDLING AND STORAGE APPARATUS
Filed April 22, 1953 6 Sheets-Sheet 1
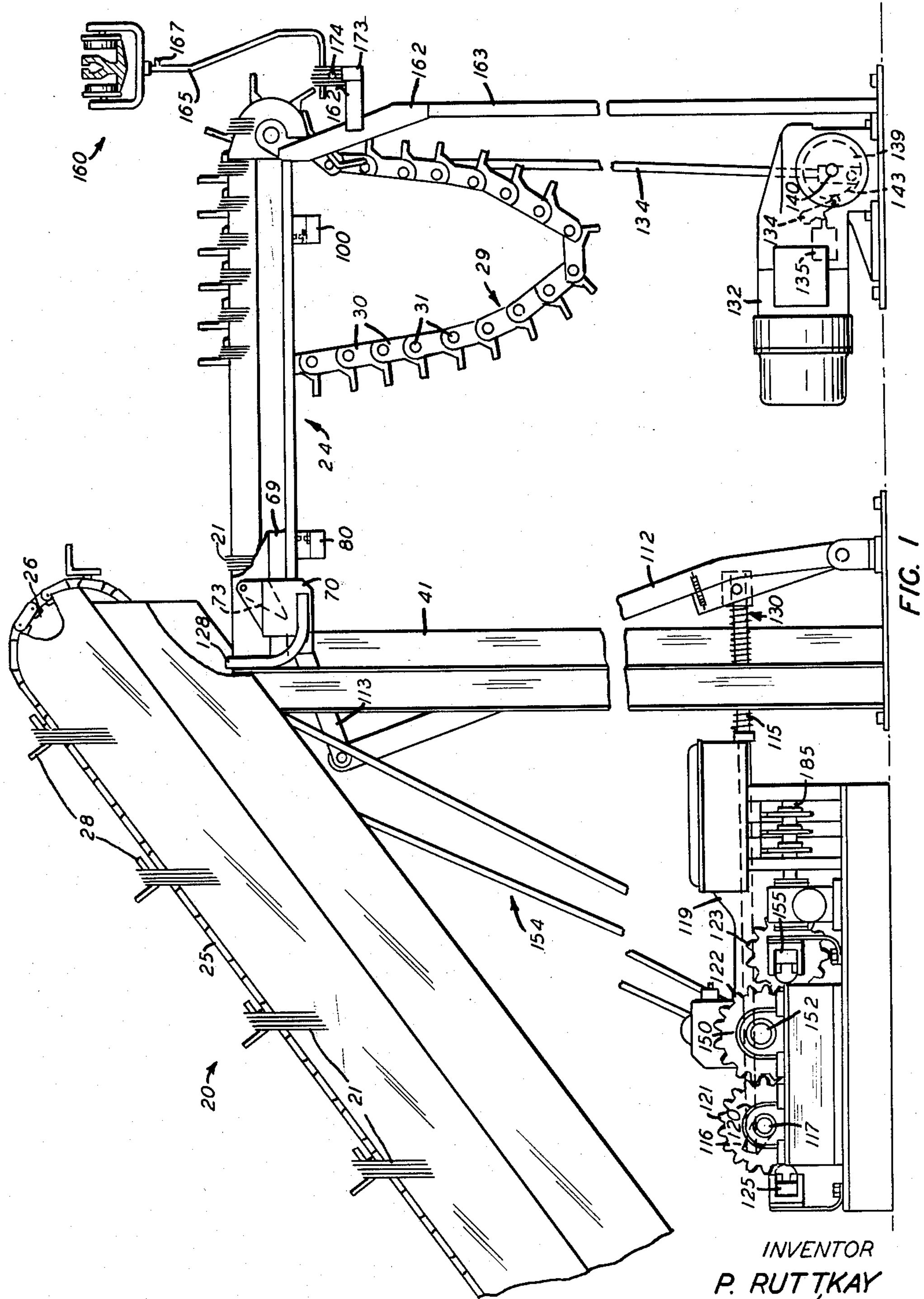
INVENTOR
P. RUTTKAY
BY C.K. Nanz
ATTORNEY ARTICLE HANDLING AND STORAGE APPARATUS
Filed April 22, 1953
6 Sheets-Sheet 2
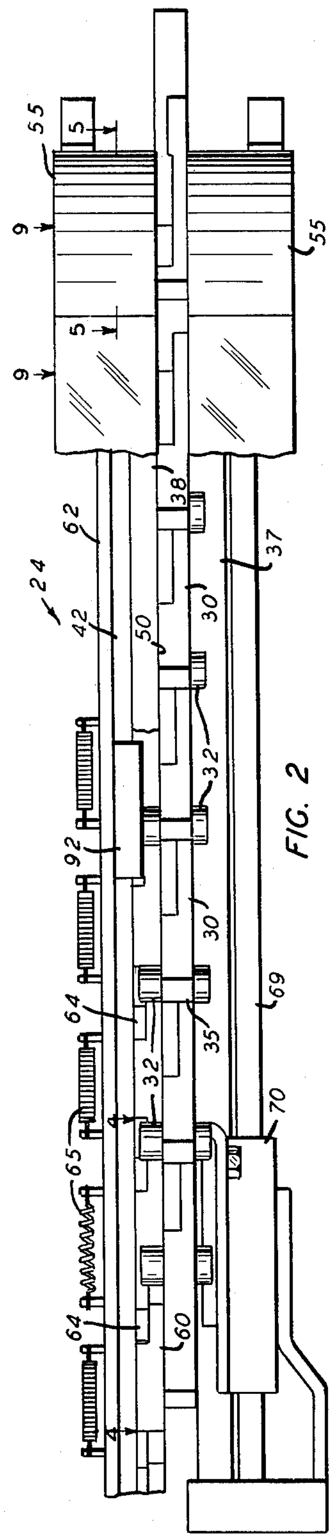
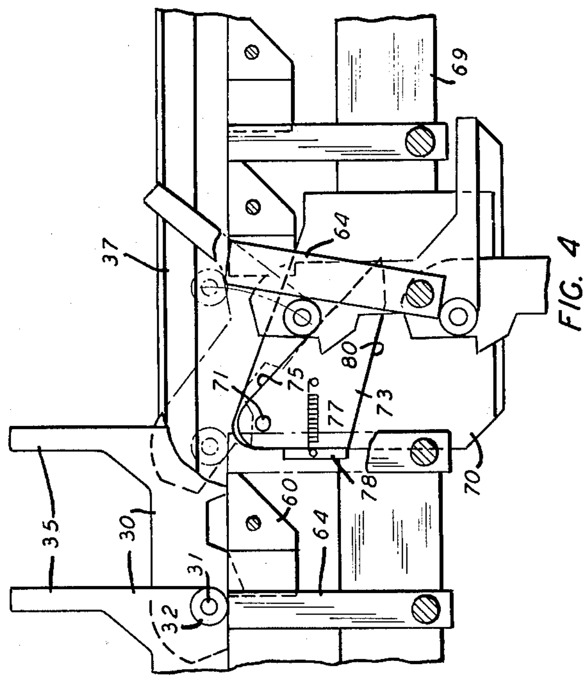
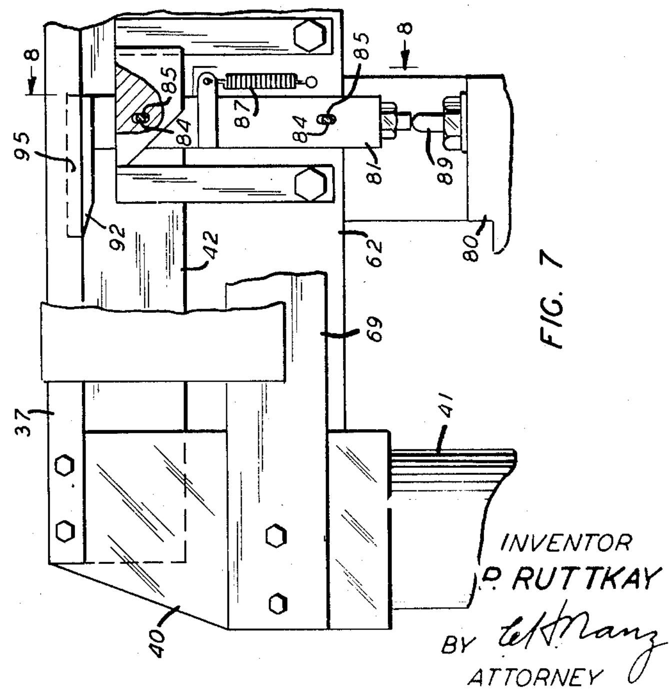
INVENTOR
P. RUTTKAY
BY [signature]
ATTORNEY May 29, 1956 P. RUTTKAY 2,747,719

ARTICLE HANDLING AND STORAGE APPARATUS

Filed April 22, 1953 6 Sheets-Sheet 3

INVENTOR
P. RUTTKAY
BY [signature]
ATTORNEY

ARTICLE HANDLING AND STORAGE APPARATUS
Filed April 22, 1953 6 Sheets-Sheet 4
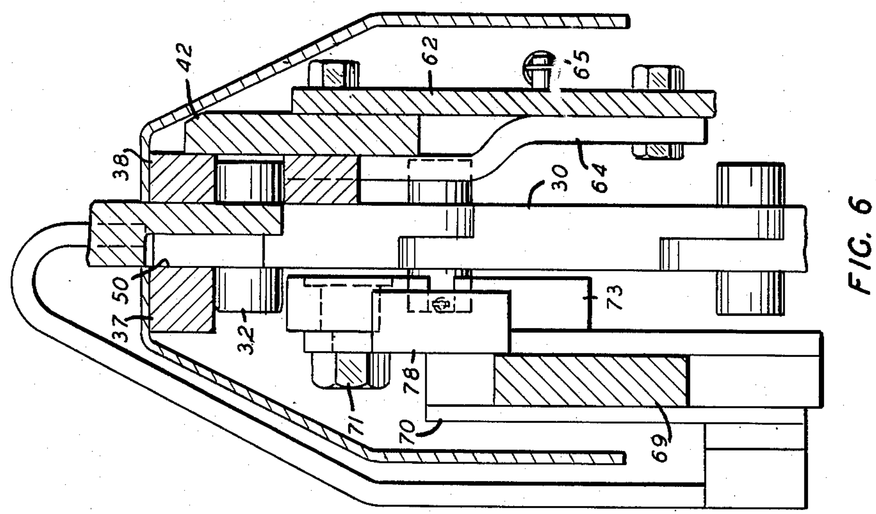
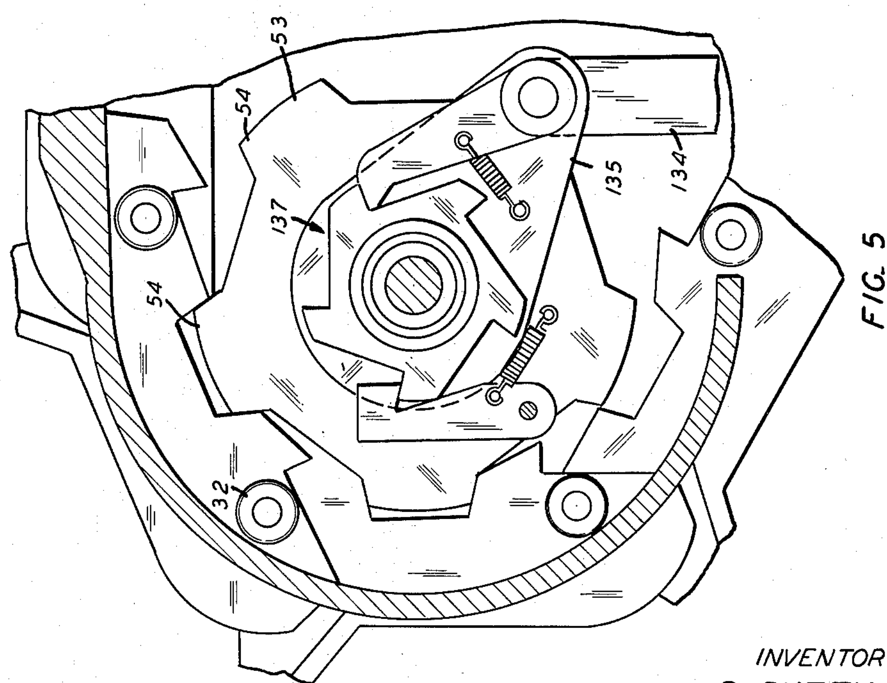
INVENTOR
P. RUTTKAY
BY
ATTORNEY ARTICLE HANDLING AND STORAGE APPARATUS
Filed April 22, 1953
6 Sheets-Sheet 5
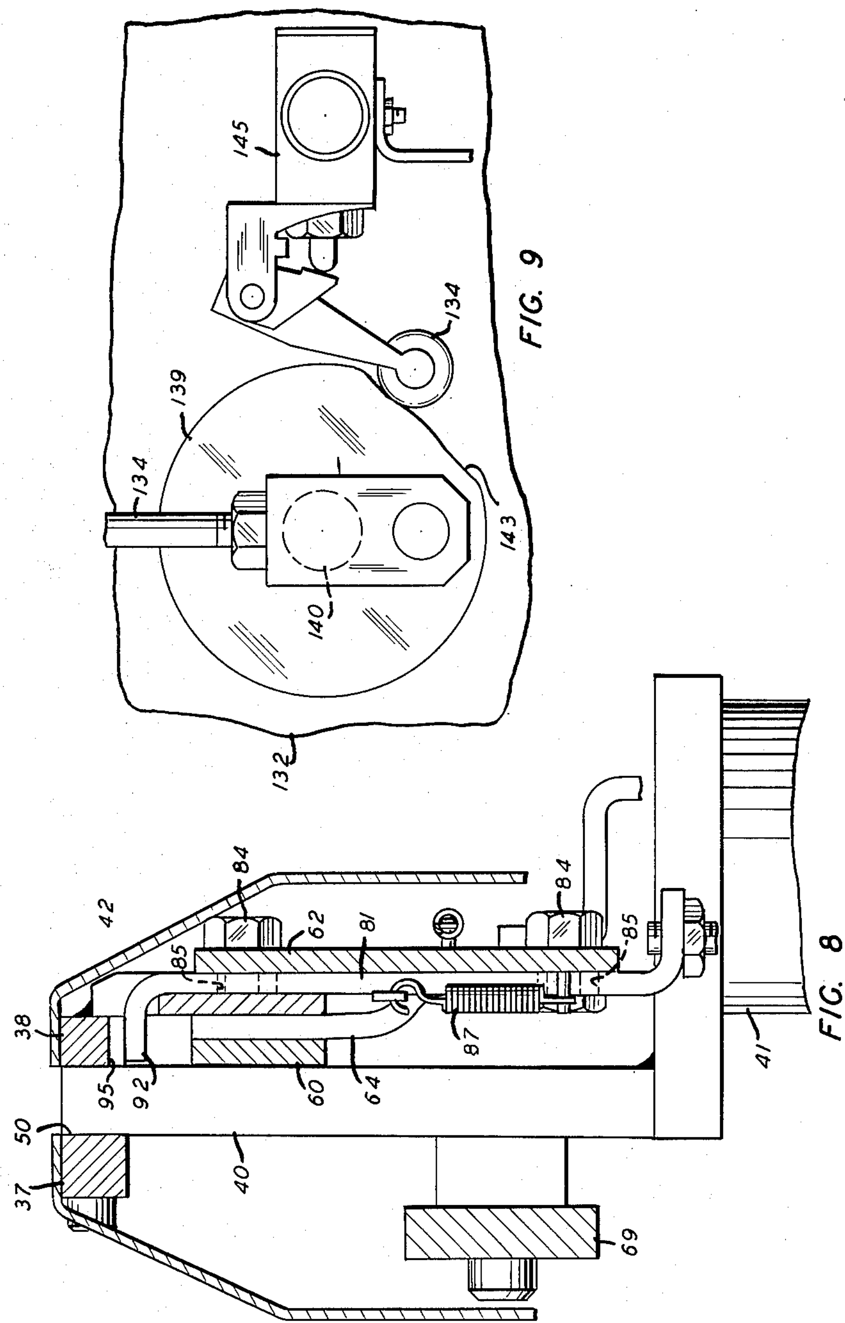
INVENTOR
P. RUTTKAY
BY
ATTORNEY May 29, 1956 P. RUTTKAY 2,747,719
ARTICLE HANDLING AND STORAGE APPARATUS
Filed April 22, 1953 6 Sheets-Sheet 6
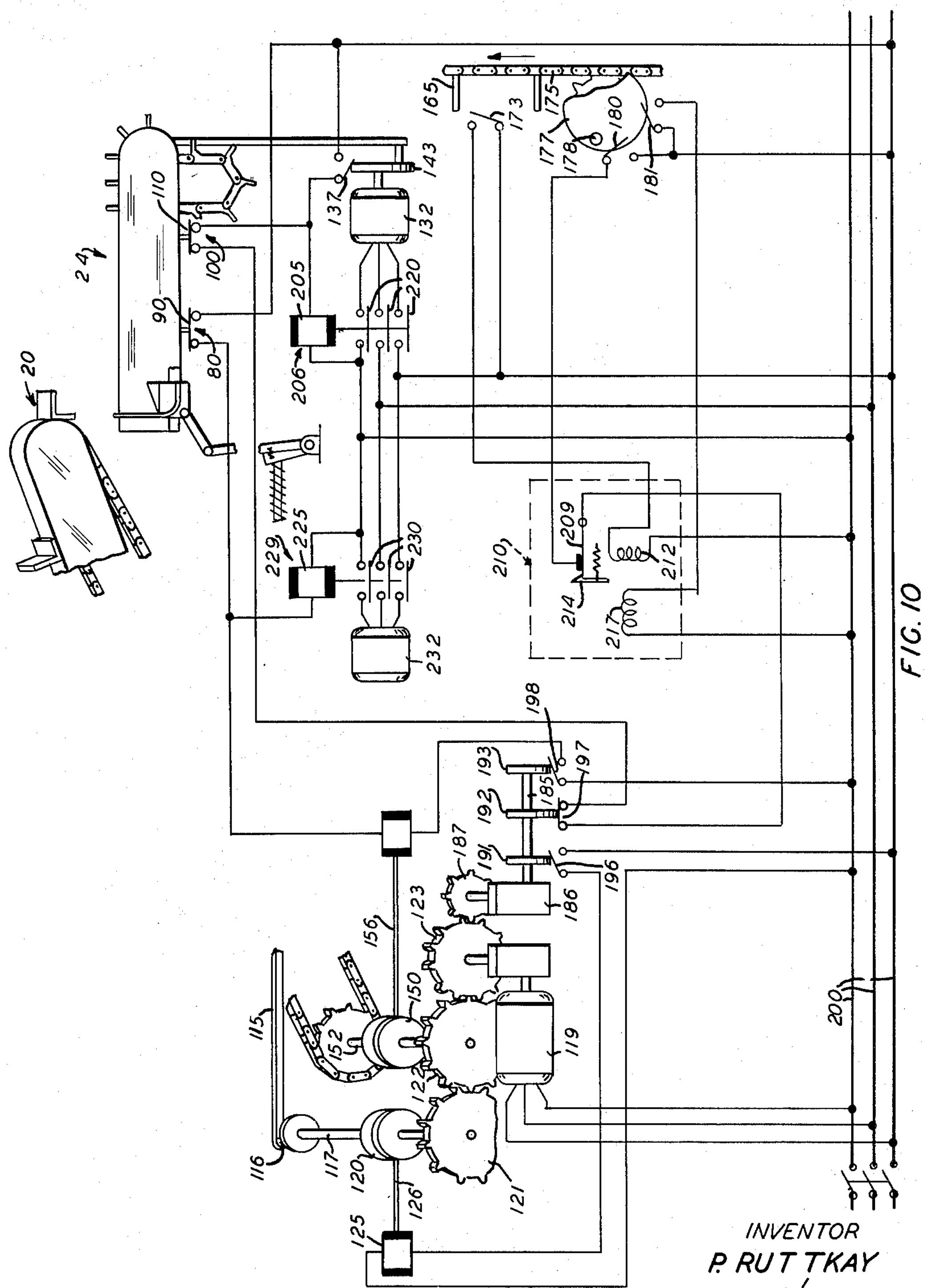
INVENTOR
P. RUTTKAY
BY [signature]
ATTORNEY

United States Patent Office 2,747,719

Patented May 29, 1956

2,747,719

ARTICLE HANDLING AND STORAGE APPARATUS

Paul Ruttkay, Opequon District, Frederick County, Va., assignor to Western Electric Company, Incorporated, New York, N. Y., a corporation of New York Application April 22, 1953, Serial No. 350,311

11 Claims. (Cl. 198—24)

This invention relates to article handling apparatus, and more particularly to apparatus for transferring articles from one conveyor to another.

In the large scale manufacture of communications equipment, it has been found necessary to transport bundles comprising a predetermined number of electrical cords from a supply thereof to a plurality of operating stations in remote sections of a plant. A continuously operated monorail conveyor is provided with a plurality of spaced carrier hooks which travel on this conveyor in an endless path past the operating stations at which the bundles of cords carried by the hooks may be removed therefrom as required.

A cord measuring and cutting machine located at the supply station continuously measures and cuts cordage into cords of a predetermined length and delivers them at a predetermined rate to a supply conveyor. The supply conveyor is periodically indexed to advance a series of spaced pallets, one space at a time into a position for receiving cords from the measuring and cutting machine to form bundles having a predetermined number of cords.

The problem of transferring the cord bundles from the supply conveyor to the individual continuously advancing hooks on the monorail conveyor is complicated by the fact that it may happen that a hook may return to the loading station still carrying a bundle. This is due to the fact that the cord bundles may or may not be removed at the operating stations depending upon the requirements of the operating stations. Since the cord measuring and cutting machine and the supply conveyor are normally continuously operated, it is necessary to provide an automatically adjustable storage means positioned between the two continuously operated conveyors to coordinate the supply of bundles with the demand therefor.

It is an object of this invention to provide new and improved article handling apparatus.

It is another object of this invention to provide new and improved apparatus for transferring articles from one conveyor to another.

An article handling apparatus illustrating certain features of this invention may include an endless chain composed of a plurality of pivotally interconnected links, each link having an article engaging portion provided thereon, a guideway wherein a number of adjacent links of the chain may be selectively, serially positioned with their article engaging portions correctly oriented for receiving articles, the links not positioned in the guideway depending in a variable length loop, means for successively and selectively positioning the links in the guideway, and means for moving the series of links positioned in the guideway to transport associated articles placed thereon along the guideway.

A complete understanding of the invention may be had from the following detailed description of an apparatus forming a specific embodiment thereof when read in conjunction with the appended drawings, in which:

Fig. 1 is a fragmentary, side elevation of apparatus forming a specific embodiment of the invention;

Fig. 2 is an enlarged, fragmentary, plan view of a portion of the apparatus shown in Fig. 1 with parts thereof broken away for clarity;

Fig. 4 is an enlarged, fragmentary, vertical section taken along line 4—4 of Fig. 2;

Fig. 5 is an enlarged, fragmentary, vertical section taken along line 5—5 of Fig. 2;

Fig. 6 is an enlarged, fragmentary, vertical section taken along line 6—6 of Fig. 3;

Fig. 7 is an enlarged, fragmentary, side elevation of another portion of the apparatus with parts thereof broken away for clarity;

Fig. 8 is an enlarged, fragmentary, vertical section taken along line 8—8 of Fig. 7;

Fig. 9 is an enlarged side elevation of an element of the apparatus shown in Fig. 1, and Fig. 10 is a schematic, electromechanical diagram illustrating an electrical control circuit associated with the apparatus.

Figure 3:
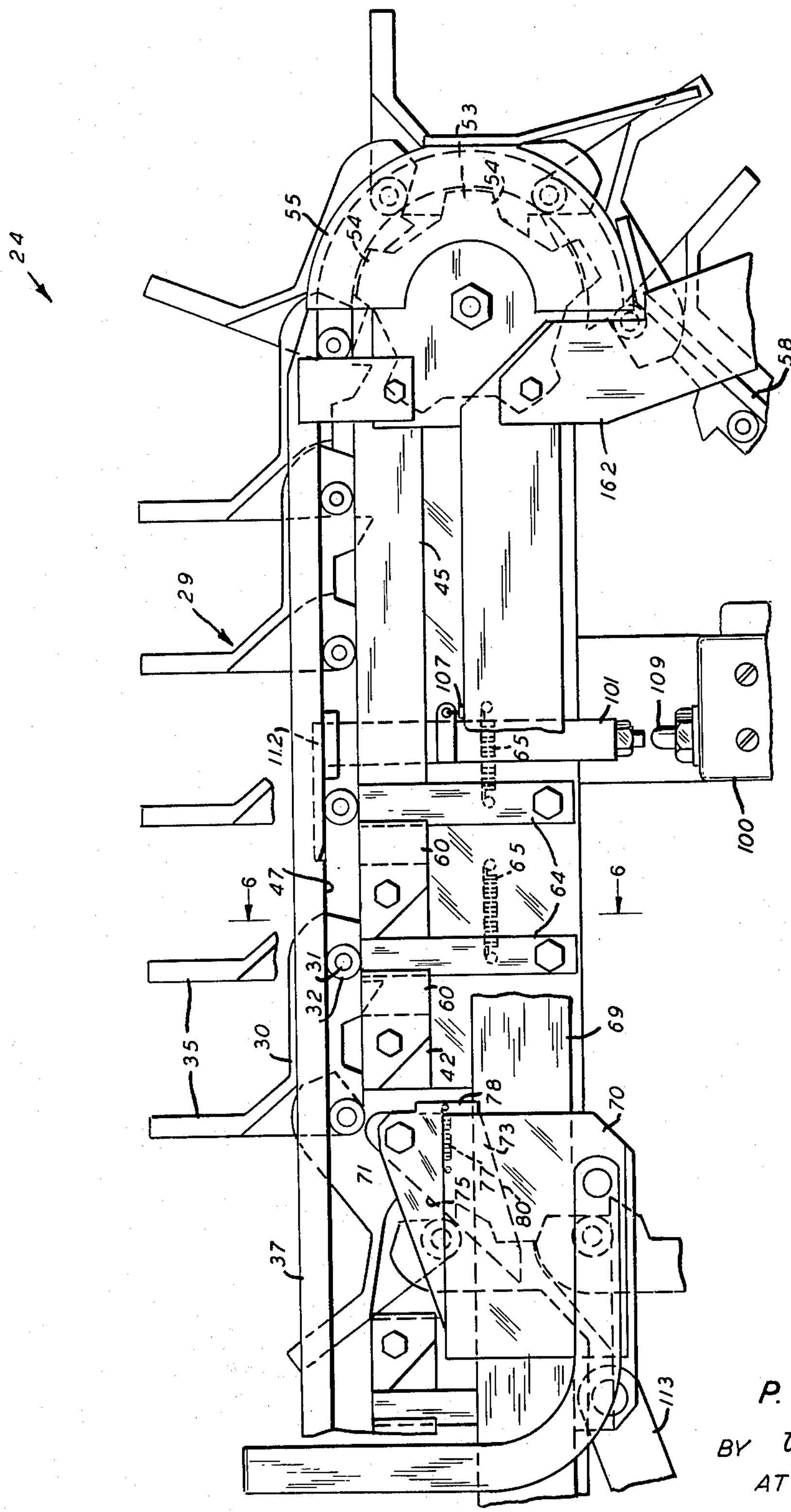
Fig. 3 is an enlarged, fragmentary, side elevation of the portion of the apparatus shown in Fig. 2 with parts thereof broken away for clarity.

Referring now to Fig. 1, there is shown an inclined supply conveyor, indicated generally at 20, which is designed to transport bundles 21—21 composed of a predetermined number of individual electrical cords from a measuring and cutting machine (not shown) to a storage conveyor indicated generally at 24. The supply conveyor 20 includes an endless roller chain 25 arranged to traverse a plurality of sprockets, one of which, a driven sprocket, designated 26 is shown.

Secured to the chain 25 at uniformly spaced intervals therealong are a plurality of bundle carriers 28—28, each designed to support a bundle 21 of cords. When a loaded carrier reaches the end of the upper leg of the chain 25 it moves about the sprocket 26 to discharge its associated bundle onto the storage conveyor 24, the left end of which is positioned directly beneath the right end of the supply conveyor 20. When a bundle is discharged from the supply conveyor it falls onto the storage conveyor 24 with the individual cords of the bundle straddling the top surface of the storage conveyor and their ends dangling down at either side as shown in Fig. 1.

The storage conveyor 24 (Fig. 3) comprises an endless chain 29 composed of a plurality of rigid links 30—30 which are hingedly secured together by a plurality of link pins 31—31. The link pins 31—31 project a short distance on either side of the hingedly interconnected links 30—30 and are provided at their ends with freely rotatable rollers 32—32 (Fig. 2). Each of the links 30—30 is provided with a perpendicular dog 35 formed integrally therewith. The link 30 with its dog 35 constitute a pallet suitable for supporting and transporting a bundle 21 of cords.

Other structural details of the storage conveyor 24 include opposed, longitudinally extending upper track bars 37 and 38 (Figs. 6 and 7) secured at their left ends, as viewed in Fig. 1, to a support plate 40 (Fig. 7) which in turn is mounted on an upright, tubular support column 41. The support plate 40 also provides a mounting for the left end of a longitudinally extending, horizontal frame member 42 which is welded along its upper edge to the track bar 38 (Fig. 7).

Fixedly secured to the frame member 42 adjacent to the right end thereof, as viewed in Fig. 3, is a lower track bar 45, the upper edge of which is spaced from the opposed lower edge of the upper track bar 38 to form a guideway 47 adapted to receive the roller 32—32 on the ends of the link pins 31—31 projecting from the inner sides of the hinged links 30—30, as viewed in Fig. 3. When the inner rollers 32—32 of the two link pins 31—31 associated with each of the links 30—30 are engaged in the guideway 47, the perpendicular dog 35 of the particular link is positioned vertically and projects from between the spaced upper track bars 37 and 38 which form a slotway 50 in the top surface of the storage conveyor 24. The length of the lower track bar 45 is such that three links 30—30 are always accommodated with their asociated rollers 32—32 engaged in the guideway 47 and supported on the lower track bar.

Positioned adjacent to the exit end of the guideway 47, at the right end of the storage conveyor 24, is a sprocket 53 having a plurality of teeth 54—54 designed to engage complementary portions on the links 30—30 for positively advancing the chain 29 upon rotation thereof. Arcuate guide members 55—55 provided at the right end of the storage conveyor 24 are designed to engage the inner and outer rollers 32—32 on the projecting ends of the link pins 31—31 to hold the links 30—30 in driving engagement with the sprocket 53 and are spaced apart to form an arcuate extension of the slotway 50 so as to permit the passage of the projecting dogs 35—35 of the individual links.

After advancing around the sprocket 53, the links 30—30 are deflected by means of angularly disposed, spaced deflector tracks, one of which designated 58 is shown in Fig. 3, attached to the under side of the guide members 55—55. The spaced top edges of deflector tracks 58—58 provide a bearing surface for engaging the inner and outer rollers 32—32 on the link pins 31—31 and direct the links 30—30 toward the left, as viewed in Fig. 3, rather than permitting them to hang down vertically as they leave the guide members.

Positioned to the left of the lower track bar 45, as viewed in Fig. 3, are a plurality of lower track blocks 60—60, the upper edges of which are aligned and coplanar with the upper edge of the lower track bar. The lower track blocks 60—60 are fixedly mounted at equally spaced intervals along the frame member 42.

Pivotally mounted at equally spaced intervals along a longitudinally extending mounting rail 62 (Fig. 6) which is secured to and depending from the frame member 42 are a plurality of latches 64—64. The latches 64—64 are normally held in a vertical position by associated bias springs 65—65 and are arranged so that when they are in this position their upper ends bridge the spaces between adjacent lower track blocks 60—60 to constitute with the track blocks a continuous support surface for the inner rollers 32—32, which in cooperation with the lower edge of the upper track bar 38 form a continuation of the guideway 47. As shown in Fig. 3, the right ends of each of the lower track blocks 60—60 are relieved to permit the latches 64—64 to pivot counterclockwise by an amount sufficient to permit the upward passage of one of the rollers 32—32 of a link 30 between opposed ends of adjacent track blocks.

Secured at its left end, as viewed in Fig. 1, to the support plate 40 and spaced therefrom is a longitudinally extending horizontal slide 69 on which a crosshead 70 is slidably mounted for reciprocatory movement therealong. Pivotally mounted on a stud 71 projecting from the inner face of the crosshead 70 is a triangular shaped cam 73 (Fig. 3) having an inclined camming surface designated 75. The cam 73 is normally positioned, as shown in Fig. 3, with a tension spring 77 holding it in this position against a stop 78 which prevents further clockwise rotation about the stud 71.

The cam 73 is so arranged that as the crosshead 70 moves from left to right along the slide 69 from the extreme left hand portion shown in Fig. 1, a lower camming surface 80 engages the outer roller 32 on the link pin 31 joining the first two links 30—30 pendantly supported from the leftmost link 30 having its inner rollers 32—32 engaged in the guideway 47. Suitable lugs provided on each of the links 30—30 prevents adjacent links from pivoting through an angle greater than 90° with respect to each other. Hence, further movement of the crosshead 70 to the right causes the cam 73 to pivot counterclockwise against the action of the spring 77, thereby permitting the crosshead and cam to pass by this particular roller 32.

When the crosshead 70 returns, moving from right to left as viewed in Fig. 3, the camming surface 75 engages the aforementioned roller 32 which rolls up the inclined camming surface as the crosshead continues to advance, causing the link 30 joined to the leftmost link 30 engaged in the guideway 47 to pivot clockwise about their common link pin 31. The arcuate path of the cam engaged outer roller 32 is shown in dashed lines in Fig. 4.

As the link 30 pivots clockwise the inner roller 32 on the link describing this arcuate path strikes one of the latches 64—64 and forces it to pivot counterclockwise, as viewed in Fig. 3, against the force exerted by the associated bias spring. This stage in the operation is illustrated in Fig. 4. The latch 64, as previously mentioned, is capable of pivoting sufficiently to permit the inner roller 32 to pass through the space between two adjacent track blocks 60—60, whereby when the cam 73 is finally disengaged from the outer roller 32 of the pivoting link the opposed inner roller 32 thereof is engaged in the guideway 47 to hold the dog 35 of this link in a vertical position. After the inner roller 32 is engaged in the guideway, the latch 64 snaps back to bridge the space between the adjacent track blocks 60—60.

Positioned near the left end of the storage conveyor 34 is a limit switch 80 (Fig. 7) which is operated by a vertically movable plunger 81. The plunger 81 is attached to the mounting rail 62 (Fig. 8) by means of fasteners 84—84 engaged in spaced vertically slotted apertures 85—85 formed in the plunger. This arrangement permits limited vertical movement of the plunger 81 between the limits of the slotted apertures 85—85. A tension spring 87 normally urges the plunger against a spring-pressed actuator 89 of the switch 80 to hold an associated contact 90 (Fig. 10) in a closed position.

The upper end of the plunger 81 is bent outwardly at a right angle with respect to the vertical axis of the plunger and is provided with a contactor plate 92 which normally lies below the bearing surface of the lower edge of the upper track bar 38 in the path of the inner rollers 32—32 engaged in the guideway 47. The contactor plate 92 when engaged by one of the rollers 32—32 is moved upwardly into a recess 95 formed in the upper track bar 38 against the force exerted by the tension spring 87. This upward displacement of the contactor plate 92 carries the plunger upwardly to release the spring-pressed actuator 89 and open the contact 90 of the switch 80.

Positioned near the right end of the storage conveyor is a limit switch 100 having an associated plunger 101 substantially identical in structure to the plunger 81. The plunger 101 is urged downwardly by a tension spring 107 against a spring-pressed actuator 109 of the limit switch 100 to hold an associated contact 110 in a normally closed condition. A contactor plate 112, similar to the contactor plate 92, is normally positioned extending into the guideway 47. When engaged by a roller 32, the contactor plate is forced upwardly against the action of the spring 107, to raise the plunger 101 and release the actuator 109 of the limit switch 100 to open the contact 110.

The crosshead 70 (Fig. 1) is operated by a pivoted transfer arm 112 which is connected to the crosshead by means of a hingedly connected linkage arm 113. The transfer arm is operated in turn by a driver 115 operated by a crank arm 116 driven from a drive shaft 117. The drive shaft 117 may be selectively operatively connected to an electric motor 119 through a conventional, solenoid-operated, single-revolution clutch 120 and gears 121, 122 and 123 (Fig. 9). The clutch 120 is operated by means of a clutch solenoid 125 which when momentarily energized releases a detent 126 to connect the shaft 117 to the motor 119 for a single-revolution of the shaft.

During the first half of a single-revolution cycle of the shaft 117, the transfer arm 112 pivots clockwise, as viewed in Fig. 1, to move the crosshead 70 from left to right, whereby a pusher 128 secured to the rear of the crosshead normally engages a cord bundle 21 previously deposited upon the storage conveyor 24 from the supply conveyor 20. The cord bundle 21 is moved to the right by the pusher 128 until it is stopped against the projecting perpendicular dog 35 of the leftmost link 30 engaged in the guideway 47, whereupon the pusher and the crosshead come to an abrupt stop. A shock absorber assembly, indicated generally at 130, provides a cushion for the shock incurred by the sudden stopping of the crosshead and transfer arm. In this manner changes in the length of travel of the crosshead 70 and the transfer arm, as the number of links 30—30 engaged in the guideway 47 varies, are compensated.

During the remaining half of the single-revolution cycle of the shaft 117, the movement of the transfer arm 112 is reversed and it pivots counterclockwise to return the crosshead 70 to the extreme left end of the storage conveyor 24. As previously mentioned, the leftward movement of the crosshead 70 results in the engagement of another link 30 in the guideway 47. This particular link with its dog 35 then serves as a pallet for transporting the last-mentioned cord bundle 21 along the storage conveyor toward the discharge end thereof upon subsequent rotation of the sprocket 53.

Intermittent, positive, clockwise rotation of the sprocket 53 is accomplished by means of an electric motor 132 which drives an operating lever 134. The upper end of the operating lever 134 is operatively connected to the sprocket 53 by means of a crank arm 135 (Fig. 5) and a pawl and ratchet arrangement, indicated generally at 137 in Fig. 5. The lower end of the operating lever 134 is eccentrically attached to a disc 139 keyed to the output shaft 140 of the motor 132, whereby the operation of the motor results in an oscillatory movement of the lever 134 which is transformed into intermittent rotation of the sprocket 53. Also mounted on the output shaft 140 is a cam 143 (Fig. 9) which operates a hinged cam follower 144 to control a motor hold-in switch 145 having a normally open contact 147 (Fig. 10). The cam 143 is designed to close the contact 147 upon energization of the motor 132 and hold the contact 147 closed for the duration of a complete single-revolution cycle of the output shaft, whereupon it reopens.

Operatively connected to the electric motor 119 by means of a conventional, single-revolution clutch 150 and gears 122 and 123 is a shaft 152. A chain drive, shown generally at 154, transmits the movement of the shaft 152 to the sprocket 26 of the supply conveyor 20. The clutch 150 is operated by means of a clutch solenoid 155 associated therewith, which when momentarily energized releases a detent 156 to effectively connect the shaft 152 to the motor 119 for a single-revolution of the shaft. The design of the chain drive 154 is such that one revolution of the shaft 152 causes the carriers 28—28 to be indexed in a clockwise direction, as viewed in Fig. 1, a distance equal to the spacing between adjacent carriers.

Referring again to Fig. 1, a monorail conveyor 160 is transversely positioned adjacent to the discharge end of the storage conveyor 24 which is supported on a forked support member 162 mounted on a support column 163. Pendantly supported from the monorail conveyor 160 are a plurality of equally spaced carrier hooks, one of which designated 165 is shown in Fig. 1. The carrier hooks 165—165 are attached to a tractor chain 167 (Fig. 10) which is continuously driven at a constant speed to advance the hooks successively past the discharge end of the storage conveyor.

Each carrier hook 165 is provided with a bundle engaging hook portion 169 which projects laterally therefrom so as to pass directly beneath the discharge end of the storage conveyor 24 for receiving cord bundles discharged therefrom. The discharge of a cord bundle 21 from the storage conveyor occurs each time the sprocket 53 is rotated to index the chain 29 a distance equal to the length of one of the links 30—30. The indexing movement causes the leading bundle-carrying link 30 to move around the sprocket whereby its associated bundle 21 falls vertically therefrom. The indexing movement of the storage conveyor 24 is coordinated with the arrival of an advancing hook, so that the bundle will fall onto the hook straddling the laterally extending bundle engaging hook portion 169. The ends of the individual cords of a bundle 21 dangle down a short distance at either side below the horizontal plane described by the advancing hook portion 169.

Mounted on a bracket 170 projecting laterally from the forked support member 162 to a point adjacent to the path of the advancing hook portion of the carrier hook is an inspection switch 173 having an actuator 174 arranged to be operated by the dangling ends of the cords of a cord bundle on the hook 165. The inspection switch is positioned so as to be actuated by a loaded carrier hook 165 prior to the arrvial of the particular hook at a point immediately opposite the discharge end of the storage conveyor.

Suitably mounted on a support structure (not shown) is a rotatable sprocket 175 (Fig. 10) which is positioned for intermeshing driving engagement with the continuously moving tractor chain 167. Keyed to the sprocket for rotation therewith is a cam 177 having an upwardly projecting pin 178 designed to successively periodically operate a spring-biased trip switch 180 and a spring-biased reset switch 181 in timed relationship with respect to the advancing tractor chain 167 and the carrier hooks 165—165. The movement of the tractor chain 167 causes the cam 177 to rotate in a counterclockwise direction, as viewed in Fig. 10, in synchronism with the moving chain. The arrangement of the cam 177 and switches 180 and 181 is such that the switch 180 is momentarily actuated each time a carrier hook 165 advances to a point immediately adjacent to the discharge end of the storage conveyor 24. The switch 181 is momentarily actuated a short time later, immediately after the particular carrier hook 165 has advanced past the discharge point.

Referring now to Fig. 10, the switches 180 and 181, together with the inspection switch 173, form parts of an electrical circuit which controls the sequence of operation of the apparatus. The electric motor 119 drives a timing shaft 185 through a gear reduction unit 186 and intermeshing gears 187 and 123. The timing shaft 185 is provided with a series of three cams, 191, 192 and 193, which control the operation of cam operated contacts 196, 197 and 198, respectively. The control circuit receives its power supply via three phase power lines 200—200 from a suitable source (not shown).

Connected across one phase of the power lines 200—200 is a series connection of the clutch solenoid 125 and the cam operated, normally open contact 196. The other clutch solenoid 155 is connected across one phase of the lines 200—200 through a series arrangement of the cam operated, normally open contact 198 and the normally closed contact 90 of the limit switch 80.

The cam operated, normally closed contact 197 is connected on one side to one of the lines 200—200 through the series connected normally closed contact 110 and an operating coil 205 of a solenoid operated relay 206. The other side of the contact 197 is connected to another of the lines 180—180 through a normally closed, spring-biased pivoted contact 209 of a conventional memory relay 210 and the normally open, cam operated, trip switch 180. The contact 209 is operated by a trip solenoid 212 which when energized moves the contact 209 counterclockwise to an open position wherein it is held by a notched spring-biased latch 214. The latch 214 may be disengaged to release the contact 209 by momentarily energizing an associated reset solenoid 217. Energization of the reset solenoid 217 pivotally moves the latch 214 counterclockwise to permit the contact 209 to spring closed.

The trip solenoid 212 is connected across one phase of lines 200—200 through the normally open inspection switch 173. The reset solenoid 217 is connected in series with the cam operated, reset switch 181 across one phase of the lines 180—180. The normally open contact 147 operated by the cam 143 is connected in parallel with the series arrangement of the contacts 110, 197, 209 and 180.

The motor 119 is continuously energized from the three phase power lines 200—200. The motor 132 may be connected to the lines 200—200 through contacts 220—220 of the solenoid operated relay 206. When the operating coil 205 is energized, the contacts 220—220 are closed to energize the motor 132. A solenoid operated relay 224 having its operating coil 225 connected across one phase of the lines 200—200 through the contact 90 operates associated contacts 230—230 which when closed energize an electric motor 232 of a cord measuring and cutting machine (not shown).

The speed of the timing shaft 185 for the purpose of illustration bears a 1:10 ratio with respect to the speed of the shafts 117 and 152 when the latter are driven. The shafts 117 and 152 are thus capable of ten revolutions per revolution of the timing shaft 185. During each complete cycle of the timing shaft 185 the cams 191, 192 and 193 operate the individual contacts 196, 197 and 198 in a predetermined sequence.

*Operation*

In operation, a predetermined number of cords per unit time are individually deposited by a cord measuring and cutting machine (not shown) onto a bundle carrier 28 positioned adjacent thereto to form a cord bundle. At the end of a predetermined time interval, the fully loaded carrier 28 is indexed ahead from left to right, as seen in Fig. 1, along the top leg of the supply conveyor 20 until the next succeeding carrier 28 is positioned to receive cords from the cutting and measuring machine. Each time the carriers 28—28 are indexed ahead, one of the carriers is moved into a bundle discharging position, wherein it drops its associated cord bundle 21 onto the top surface of the storage conveyor 24. The individual cords of the bundle are positioned straddling the slotway 50 with their ends dangling down on either side.

For the purpose of illustrating the operation of the apparatus, it will be assumed that the predetermined number of cords constituting a full bundle are delivered to a carrier 28 positioned adjacent to the cord measuring and cutting machine every twenty seconds. Therefore, as long as the machine is operating, it is necessary that the supply conveyor 20 be indexed ahead every twenty seconds, so that the bundles 21—21 will each contain the predetermined number of cords. In view of this requirement, the gear ratio of the drive of the timing shaft 185 is such that it makes one revolution every twenty seconds, whereby a complete cyclic sequence of operation of the contacts 196, 197 and 198 is repeated every twenty seconds.

The tractor chain 167 is driven at a linear speed of fifteen feet per minute and the carrier hooks 165—165 are spaced at uniform intervals of 12 inches along the chain 167. As previously mentioned, the monorail conveyor 160 follows an endless path past operating stations in remote sections of the plant, at each of which a cord bundle 21 may or may not be removed from a carrier hook. Thus, one carrier hook 165, which may be either empty or loaded, advances past the discharge end of the storage conveyor 24 every four seconds.

The sequence of operation of the cam operated contracts 196, 197 and 198 is such that at the start of a cycle of the timing shaft 185, the normally open contact 198 closes, the normally closed contact 197 is closed and the normally open contact 196 is open. The contact 198 remains closed for one and one-half seconds, during which time it energizes the clutch solenoid 155 to trip the clutch 150 for a single-revolution cycle of the shaft 152. The single-revolution of the shaft 152 indexes the chain 25 of the supply conveyor 20 to move the carriers 28—28 one step ahead, whereby the leading carrier discharges its associated bundle onto the storage conveyor 24. This indexing operation of the supply conveyor 20 is completed in two seconds.'

At the end of one and one-half seconds of the cycle, as mentioned above, the contact 198 is reopened. At that time the normally closed contact 197 is opened to temporarily prevent a subsequent energization of the motor 132 when an empty hook reaches the discharge end of the storage conveyor 24.

At the end of two and one-half seconds, the normally open contact 196 is closed to energize the clutch solenoid 125, which trips the clutch 120 to initiate a single-revolution cycle of the shaft 117. As heretofore described, the transfer arm 112 pivots clockwise, as viewed in Fig. 1, during the first half of the single-revolution cycle of the shaft 117 to move the crosshead 70 from left to right. This movement of the crosshead 70 causes the bundle previously deposited upon the left end of the storage conveyor 24 to be swept by the pusher 128 against the rear of the perpendicular dog 35 of the last of the series of links 30—30 engaged in the guideway 47, which projects from the slotway 50.

During the latter half of the single-revolution cycle, the transfer arm returns to its original position, moving the crosshead 70 from right to left. As the crosshead 70 moves leftwardly, the camming surface 75 of the triangular shaped cam 73 engages the outer roller 32 on the link pin 31 interconnecting the first two links 30—30 pendantly supported from the leftmost of the series of links 30—30 engaged in the guideway 47. The engaged roller 32 proceeds to roll up the inclined camming surface 75 as the crosshead continues to move to the left and in so doing causes the pendantly supported link 30 adjacent to the leftmost link 30 of the series of links 30—30 engaged in the guideway 47 to pivot about their common link pin 31.

As noted previously, the arcuate path of the cam engaged outer roller 32 is shown in dashed lines in Fig. 4. As the link 30 pivots clockwise, the inner roller 32 describing the same arcuate path strikes one of the latches 64—64 and forces it to pivot counterclockwise, as viewed in Fig. 3, to permit the inner roller 32 to pass through the space between two adjacent track blocks 60—60. Hence, when the outer roller 32 is finally disengaged from the cam 73, the particular link has its two associated inner rollers 32—32 engaged in the guideway 47 to hold the dog 35 of this link in a vertical position in the slotway 50. The dog 35 of the last engaged link now forms a pallet for transporting the cord bundle 21 along the storage conveyor toward the discharge end thereof.

After four seconds of the cycle have elapsed, the contact 196 is reopened. It will be noted that the lapse of time during which the contact 196 was closed, being only one and one-half seconds, is insufficient to permit more than a single-revolution of the shaft 117. At the end of four and one-half seconds of the timing shaft cycle, the normally closed contact 197 is reclosed and remains in this condition until one and one-half seconds of the next subsequent cycle have elapsed. With the contact 197 closed, the control circuit is now conditioned for indexing the storage conveyor each time a carrier hook 165 reaches a position adjacent to the discharge end of the storage conveyor 24 for receiving a cord bundle 21 discharged therefrom.

Each time a carrier hook 165 reaches the discharge end of the storage conveyor, the trip switch 180 is momentarily closed. If the closing of the trip switch 180 occurs during the seventeen seconds of the timing shaft cycle during which the contact 197 is in its normally closed condition, the solenoid 205 of the relay 206 is momentarily energized to momentarily close the contacts 220—220. With the contacts 220—220 momentarily closed, the electric motor 132 is energized to drive the operating lever 134. Although the contacts 220—220 reopen immediately, the motor 132 remains energized for a complete revolution of its output shaft 140 due to the fact that the cam 143 closes the contact 147 of the motor holding switch 145 for the duration of the single-revolution cycle whereupon it reopens. During the single-revolution cycle of the output shaft of the electric motor 132, the lever 134 is oscillated to index the links 30—30 engaged in the guideway 47 toward the discharge end of the conveyor to move the leading link of the series of links engaged in the guideway 47 into a position wherein its associated bundle is discharged therefrom onto the hook portion 169 of the passing carrier hook 165.

It will be noted, however, that if the carrier hook 165 approaching the discharge end of the storage conveyor is already loaded with a cord bundle 21, the dangling ends of this bundle will operate the inspection switch 173 momentarily to a closed position. The momentary closure of switch 173 results in the momentary energization of the solenoid 212, which opens the contact 209 to prevent an indexing operation of the storage conveyor upon the subsequent closing of the trip switch 180. This action prevents a cord bundle 21 from being transferred from a storage conveyor onto a loaded carrier hook. Since the reset switch 180 is operated each time, immediately after a carrier hook 165 passes the discharge end of the storage conveyor 24, to energize the reset solenoid 217, the control circuit is reconditioned by permitting the contact 209 of the memory relay to close, whereby when the next empty carrier hook is positioned for receiving a bundle 21 from the storage conveyor 24 the momentary closing of the trip switch 180 will normally result in an indexing operation of the storage conveyor.

The limit switch 100 positioned near the right end of the storage conveyor prevents an indexing operation of the storage conveyor 24 whenever less than three cord bundles 21—21 are stored on the conveyor 24. Similarly the limit switch 80 prevents the accumulation of more than a predetermined number of cord bundles in storage on the conveyor 24. It is manifest that when the contact 90 of the switch 80 is opened in a manner previously described, it breaks the branch circuit including the clutch solenoid 155 and thereby prevents subsequent operation of the supply conveyor until a cord bundle 21 is discharged from the storage conveyor and the series of engaged links 30—30 move to the right one space to permit the contact 90 to reclose. The opening of the contact 80 also de-energizes the operating coil 225 of the solenoid operated relay 224, which opens its contacts 230—230 to de-energize the electric motor 232 to stop the cord measuring and cutting machines.

The number of cord bundles 21—21 in storage on the conveyor 24 varies from time to time in accordance with the demands of the operating stations. It is possible that during the seventeen seconds of each twenty second timing shaft cycle, during which bundles may be discharged from the storage conveyor, the four or five carrier hooks 165—165 which pass the discharge end thereof may be already loaded and not require a bundle. Hence, the one bundle which was delivered by the supply conveyor 20 will increase the number of bundles stored on the storage conveyor. It is apparent that more than one carrier hook 165 may be loaded during each cycle of the timing shaft. However, since only one bundle is delivered to the storage conveyor per cycle, the loading of more than one carrier hook cannot occur unless the storage conveyor has at that time the required number of cord bundles in excess of the three which always remain on the storage conveyor.

It will be understood that this invention is not limited to the specific details described in connection with the above embodiment of the invention. It is manifest that various modifications and rearrangements of the apparatus may be made within the spirit and scope of the invention.

What is claimed is:

1. Article handling apparatus, which comprises an endless chain composed of a plurality of pivotally interconnected links each having an article engaging portion, a guideway wherein adjacent links of said chain may be engaged slidably and serially with their article engaging portions oriented to receive articles, the links not engaged in the guideway depending in a free loop beneath the guideway, means for successively moving links from the depending loop into engagement in the slideway while maintaining the series of slidably engaged links stationary, and means for moving said series of slidably engaged links along the slideway toward one end thereof to cause the leading link of said series to discharge an article carried thereby and to become disengaged from the guideway.

2. Article handling apparatus, which comprises an endless chain composed of a plurality of pivotally interconnected links each having an article engaging portion, a guideway wherein adjacent links of said chain may be engaged slidably and serially with their article engaging portions oriented to receive articles, the links not engaged in the guideway depending in a free loop beneath the guideway, cam means operated periodically for successively moving links from the depending loop into engagement in the slideway while maintaining the series of slidably engaged links stationary, and means for moving said series of slidably engaged links along the slideway toward one end thereof to cause the leading link of said series to discharge an article supported thereon and to become disengaged from the guideway.

3. A variable capacity storage conveyor for temporarily storing and transporting articles therealong, which comprises a plurality of links each having an article receiving portion for supporting an article placed thereon, means pivotally interconnecting the opposite ends of each of said links to the ends of adjacent links to form a flexible endless chain, projecting guide members provided at both ends of said links, a guideway arranged to slidably support adjacent guide members engaged therein for longitudinal movement therealong, whereby each link of a series of adjacent links having both guide members thereon engaged in the guideway is slidably retained in such a position that its article receiving portion is oriented to receive an article and the remaining links depend in a free loop, camming means for successively moving guide members on succeeding links in the loop into engagement in the slideway while maintaining the series of links retained in the guideway stationary, and means independent of said camming means for moving the series of links slidably retained in the guideway to transport articles placed thereon toward the discharge end of the conveyor.

4. Apparatus for temporarily storing articles periodically discharged from a supply conveyor and transferring them to continuously advancing conveyor hooks, which comprises an endless chain composed of a plurality of pivotally interconnected links, each link having an article engaging portion, a support structure having one end positioned for receiving articles from the supply conveyor and its other end positioned adjacent to the path of the advancing conveyor hooks, said support structure having a guideway associated therewith wherein a variable number of adjacent links may be slidably positioned sequentially with their associated article engaging portions projecting above the article supporting surface of the support structure, the remaining links not positioned in the guideway being pendantly supported in a variable length loop beneath the support structure, means for periodically positioning successive links of the chain in the guideway each time an article is deposited by the supply conveyor onto the support structure, the last-positioned link engaging the article last discharged by the supply conveyor to transport said article, and means for indexing the series of links positioned in the guideway to advance the articles on their associated links toward the discharge end of the support structure, whereby the leading link of said series discharges its associated article onto a passing conveyor hook and becomes disengaged from the guideway.

5. Apparatus for temporarily storing articles periodically discharged from a supply conveyor and transferring them to continuously advancing conveyor hooks, which comprises a plurality of links having article engaging portions, said links being pivotally interconnected to form an endless flexible chain, a support structure having one end positioned to receive articles from the supply conveyor and its other end positioned adjacent to the path of the advancing conveyor hooks, said support structure having a guideway associated therewith, wherein a series of adjacent links may be slidably positioned sequentially with the article engaging portions thereof projecting above the article supporting surface of the support structure for carrying articles placed thereon, a cross head slidably mounted for longitudinal movement parallel and adjacent to the series of links positioned in the guideway, camming means attached to the crosshead, means for periodically reciprocating the crosshead whereby the camming means cams the next succeedinging link of the chain into position in the guideway to receive the article previously deposited upon the support structure by the supply conveyor, and means for advancing the series of links slidably positioned in the guideway toward the discharge end of the support structure, whereby the leading link of said series of links discharges its associated article onto a passing conveyor hook and becomes disengaged from the guideway.

6. Apparatus for temporarily storing articles periodically discharged from a supply conveyor and transferring them to continuously advancing conveyor hooks, which comprises a plurality of links having article engaging portions, said links being pivotally interconnected to form an endless flexible chain, a support structure having one end positioned to receive articles from the supply conveyor and its other end positioned adjacent to the path of the advancing conveyor hooks, said support structure having a guideway associated therewith, wherein a variable number of adjacent links may be slidably positioned sequentially with the article engaging portions thereof projecting above the article supporting surface of the support structure for carrying articles placed thereon, a crosshead slidably mounted for longitudinal movement along the support structure adjacent to the series of links positioned in the guideway, camming means attached to the crosshead, means for periodically reciprocating the crosshead, whereby the camming means cams the next succeeding link of the chain into position in the guideway to receive the article previously deposited upon the support structure by the supply conveyor, pusher means associated with the crosshead for correctly placing the last-mentioned article for reception by said last-mentioned link prior to the positioning of said link in the guideway, and means for advancing the series of links slidably positioned in the guideway toward the discharge end of the support structure, whereby the leading link of said series of links discharges its associated article onto a passing conveyor hook and becomes disengaged from the guideway.

7. A storage conveyor for temporarily storing bundles of cords periodically delivered to one end thereof and transporting them individually to the discharge end thereof for transferal to continuously advancing carrier hooks, which comprises a plurality of links having projecting article receiving portions, a plurality of link pins pivotally interconnecting the opposite ends of each of said links to the adjacent ends of adjacent links to form a flexible endless chain, the opposite ends of said pins projecting laterally from either side of the interconnected links, a pair of spaced tracks forming a slotted support surface for bundles delivered to the conveyor, means cooperating with one of said tracks to form a longitudinally extending guideway wherein the inner projecting ends of adjacent link pins are slidably positioned sequentially, said guideway serving to slidably retain a link having its two associated links pins slidably positioned therein in a position such that its article receiving portion projects upwardly through a slot formed by the spaced tracks to support a bundle placed thereon, means for varying the number of links slidably retained in the guideway by individually camming successive link pins into position in the guideway, and means for advancing the links to transport bundles placed thereon toward the discharge end of the conveyor for transferal to the conveyor hooks.

8. A storage conveyor for temporarily storing bundles of cords periodically delivered to one end thereof and transporting them individually to the discharge end thereof for transferal to continuously advancing carrier hooks, which comprises a plurality of links having projecting article receiving portions, a plurality of link pins pivotally interconnecting the opposite ends of each of said links to the adjacent ends of adjacent links to form a flexible endless chain, the opposite ends of said pins projecting laterally from either side of the interconnected links, a pair of spaced tracks forming a slotted support surface for bundles delivered to the conveyor, means cooperating with one of said tracks to form a longitudinally extending guideway wherein the inner projecting ends of adjacent link pins may be slidably positioned sequentially, said guideway serving to slidably retain a link having its two associated link pins slidably positioned therein in a position such that its article receiving portion projects upwardly through a slot formed by the spaced tracks for carrying bundles placed thereon, means for varying the number of links slidably retained in the guideway by individually camming successive link pins into position in the guideway, a drive sprocket engageable with complementary portions formed on each of the links and rotatable to move the series of slidably retained links toward the discharge end of the conveyor, means for selectively rotatably indexing the sprocket, whereby the leading link of said series discharges its associated article onto a passing conveyor hook and its leading link pin becomes disengaged from the guideway, and means for rendering the indexing means inoperative whenever the number of links slidably retained by the guideway falls below a predetermined minimum.

9. A storage conveyor for temporarily storing bundles of cords periodically delivered to one end thereof and transporting them individually to the discharge end thereof for transferal to continuously advancing carrier hooks, which comprises a plurality of links having projecting article receiving portions, a plurality of link pins pivotally interconnecting the opposite ends of each of said links to the adjacent ends of adjacent links to form a flexible endless chain, the opposite ends of said pins projecting laterally from either side of the interconnected links, a pair of spaced tracks forming a slotted support surface for bundles delivered to the conveyor, means cooperating with one of said tracks to form a longitudinally extending guideway wherein the inner projecting ends of adjacent link pins may be slidably positioned sequentially, the guideway serving to slidably retain a link having its two associated link pins slidably positioned therein in a position such that its article receiving portion projects upwardly through a slot formed by the tracks for carrying bundles placed thereon, a crosshead slidably mounted for longitudinal movement parallel to the guideway, cam means attached to the crosshead and selectively engageable with the projecting outer ends of successive individual link pins, means for reciprocating the crosshead each time a bundle is deposited on the end of the conveyor, a bundle pusher mounted on the crosshead for movement therewith, said pusher having a portion thereof extending into the slot between the tracks for engaging the last-mentioned bundle on the forward stroke of the crosshead and pushing it to a position wherein it may be received by the article receiving portion of a link which is subsequently cammed into a slidably retained position by the cam which on its return stroke engages the projecting outer end of its unengaged link pin and urges the inner end thereof into position in the guideway, and means for selectively indexing the series of slidably retained links to cause the leading link of said series to discharge its associated bundle from the discharge end of the conveyor onto an empty conveyor hook.

10. Article handling apparatus, which comprises an endless chain composed of a plurality of pivotally interconnected links each having an article engaging portion, a guideway wherein adjacent links of said chain may be engaged slidably and serially with their article engaging portions oriented to receive articles, the links not engaged in the guideway depending in a free loop beneath the guideway, means for successively moving links from the depending loop into engagement in the slideway while maintaining the series of slidably engaged links stationary, means for rendering said last-mentioned means inoperative when a predetermined maximum number of links are engaged slidably and serially in the slideway, means for moving said series of slidably engaged links along the slideway toward one end thereof to cause the leading link of said series to discharge an article supported thereon and to become disengaged from the guideway, and means for rendering said last-mentioned means inoperative when there are less than a predetermined minimum number of links slidably and serially engaged in the slideway.

11. Article handling apparatus, which comprises an endless chain composed of a plurality of pivotally interconnected links each having an article engaging portion, a guideway wherein adjacent links of said chain may be engaged slidably and serially with their article engaging portions oriented to receive articles, the links not engaged in the guideway depending in a free loop beneath the guideway, cam means operated periodically for successively moving links from the depending loop into engagement in the slideway while maintaining the series of slidably engaged links stationary, means for rendering the cam means inoperative when a predetermined maximum number of links are engaged slidably and serially in the slideway, means for moving said series of slidably engaged links along the slideway toward one end thereof to cause the leading link of said series to discharge an article supported thereon and to become disengaged from the guideway, and means independent of the cam means for rendering said last-mentioned means inoperative when there are less than a predetermined minimum number of links slidably and serially engaged in the slideway.

References Cited in the file of this patent

UNITED STATES PATENTS

| | | |
|---|---|---|
| 1,865,337 | Rose | June 28, 1932 |
| 2,480,253 | Malhiot | Aug. 30, 1949 |